US008321480B2

United States Patent
Smith

(10) Patent No.: US 8,321,480 B2
(45) Date of Patent: Nov. 27, 2012

(54) FULL-FUNCTION TO HIGH AVAILABILITY LARGE DATABASE CONVERSION

(75) Inventor: David Albert Smith, Katy, TX (US)

(73) Assignee: BMC Software, Inc., Houston, TX (US)

( * ) Notice: Subject to any disclaimer, the term of this patent is extended or adjusted under 35 U.S.C. 154(b) by 91 days.

(21) Appl. No.: 12/954,085

(22) Filed: Nov. 24, 2010

(65) Prior Publication Data

US 2012/0131067 A1    May 24, 2012

(51) Int. Cl.
G06F 17/30    (2006.01)

(52) U.S. Cl. ......... 707/809; 707/756; 707/803; 707/812

(58) Field of Classification Search ........... 707/999.101, 707/803, 809, 812, 756
See application file for complete search history.

(56) References Cited

U.S. PATENT DOCUMENTS

| 5,615,400 A * | 3/1997 | Cowsar et al. ............... 719/332 |
| 2011/0161919 A1* | 6/2011 | Alexander et al. ........... 717/105 |
| 2011/0161924 A1* | 6/2011 | Alexander et al. ........... 717/109 |

OTHER PUBLICATIONS

Sudipta Sengupta; "HALDB Migration & Maintenance"; Sep. 30, 2009; BMCsoftware.*

* cited by examiner

*Primary Examiner* — Dennis Truong

(57) ABSTRACT

Systems, methods and computer readable medium for migrating Information Management System (IMS) Full-Function databases to IMS High Availability Large Databases (HALDBs) are described. Full Function database conversion operations in accordance with this disclosure assign a unique identifier to each segment having a physically paired logically related child segment. These unique identifiers may then be used during HALDB load operations to identify a segment's physically paired logically related segment. Use of the disclosed unique identifiers permit Full Function database conversion operations to avoid the input-output (I/O) and compare operations needed by prior art unload techniques to completely identify physically paired logically related segments.

22 Claims, 10 Drawing Sheets

FULL-FUNCTION TO HIGH AVAILABILITY LARGE DATABASE CONVERSION

BACKGROUND

This disclosure relates generally to the field of database management and administration. More particularly, this disclosure relates to migrating an Information Management System (IMS) Full-Function database to an IMS High Availability Large Database (HALDB).

IMS refers to both a hierarchical database and an information management system. The IMS database component stores data using a hierarchical model in blocks of data known as segments. There are three basic forms or types of IMS databases: Full-Function; Fast-Path; and HALDB. Full-Function databases can have primary and secondary indexes, are accessed using DL/I calls, and store data using Virtual Sequential Access Method, VSAM (a native z/OS access method) or Overflow Sequential Access Method, OSAM (an IMS-specific access method). HALDBs are an extension of IMS Full Function databases and were designed to provide better availability, better handling of extremely large data volumes, and online reorganization to support near continuous availability.

One significant difference between a Full Function database and a HALDB is how paired logical child relationships are represented. In a Full Function database, each segment having a bidirectional physically paired logical relationship with another segment has a pointer to its physically paired child segment's physical parent (i.e., a pointer to its logical parent). In contrast, physically paired logical relationships in a HALDB are represented directly. That is, a HALDB segment has a direct pointer to its physically paired logical child segment.

Due to the indirect nature of the paired logical child relationship representation adopted by Full Function databases, the conversion of large Full Function databases to HALDBs can involve an extremely large number of input-output (I/O) operations (to locate each segment's paired logical segment). Because I/O operations are time intensive, conversion of large Full Function databases to HALDBs has been impractical at best and, from a business stand-point, often times impossible. This problem is exacerbated by the fact that IMS does not support logical relationships between a HALDB and a non-HALDB (e.g., a Full Function database). As a consequence, all databases that are logically related to one another must be migrated together (to the HALDB format).

To better understand the scope of this process, FIG. 1 (Full Function database unload operation 12) and FIG. 2 (Full Function to HALDB load operation 200) illustrate a prior art conversion process. Referring first to FIG. 1, a first Full Function database is selected for conversion (block 13). A first segment from this database is then unloaded (block 14) and checked to see if it has a physically paired logical child segment (block 15). It will be recognized the existence of physically paired logical relationships is retained in an IMS database's Database Descriptor (DBD). Thus, acts in accordance with block 15 may utilize the selected database's DBD to determine if the segment obtained during block 14 (the "current" segment) has a physically paired logical child segment. If the current segment has a physically paired logical child segment (the "YES" prong of block 15), that database in which the paired child segment exists is, if needed, opened (block 16). Each child segment of the current segment's logical parent is then retrieved and searched until the exact paired child segment is identified (block 17). Once the paired logical child segment is identified, its address is saved in the selected database's unload file (block 18).

Following the acts of block 18 or if the current segment does not have a physically paired logical child segment (the "NO" prong of block 15), a check is made to determine if the selected database has any remaining segments to unload (block 19). If at least one segment remains to be unloaded (the "YES" prong of block 19), that segment is retrieved (block 14), whereafter unload process 12 continues at block 15. If all segments have been unloaded (the "NO" prong of block 19), unload operations 14-19 are repeated for each logically related Full Function database (block 20). The result of unload process 12 is two or more unload files 21.

Referring to FIG. 2, prior art Full Function to HALDB load operation 200 begins by selecting an unload file from the set of unload files 21 generated in accordance with unload process 12 (block 205). The HALDB into which the Full Function database content (i.e., the content of the selected unload file) is to be placed is defined (block 210), whereafter the selected unload file's content is loaded into the newly defined HALDB (block 215). If all of the unload files generated in accordance with unload operation 12 (i.e., unload files 21) have been loaded into new HALDBs (the "YES" prong of block 220), load operation 200 is complete. If at least one unload file remains to be processed (the "NO" prong of block 220, the acts of blocks 205-220 are repeated. The completion of unload operation 12 and load operation 200 constitutes a Full Function to HALDB conversion process.

The extent of required I/O operations needed to effect prior art unload operation 12 and, in particular, actions associated with block 17 may be understood with respect to FIG. 3. As shown, illustrative prior art Full Function database 1 has segment 2 that has a physically paired logical relationship with segment 3 in Full Function database 4. As shown, segment 2 includes pointer 5 to segment 3's physical parent 6 (to the logical parent of segment 2). Similarly, segment 3 in database 4 includes pointer 7 to its logical parent 7 (i.e., the physical parent of segment 2).

Thus, after segment 2 is unloaded from database 1 in accordance with block 14 and found to have a physically paired logical child segment in accordance with block 15, every child segment of parent segment 6 (represented as a "stack" of segments in FIG. 3) must be retrieved from database 4 one at a time and their data content compared to the data content of segment 2. Only when a match is found does operation 12 know the location (i.e., address) of segment 2's physically paired logical child segment 3. This information is needed to represent a physically paired logical relationship in database 1's HALDB incarnation (defined in accordance with block 210).

In general, each segment retrieval from database 4 represents an I/O operation. In commercial IMS databases, the number of child segments under any given parent segment (e.g., segment 6 or 7) can number in the millions. As a result, locating segment 2's physically paired logical child segment 3 may entail millions of I/O operations. In addition, when database 4 is itself unloaded (in accordance with 12), all of parent 7's segments must be retrieved one at a time and their data content compared to the data content of segment 3. For large Full Function databases having many logically paired relationships with other (large) Full Function databases, the time required to perform conversion unload process 12 may run from 1 day to several tens of days. For many commercial operations where these databases are used to store critical business information, taking a database offline for sufficient time to perform this conversion is not an option.

SUMMARY

Systems, methods and computer readable medium for migrating databases from a first format to a second format are described. In one embodiment, a method is disclosed that includes determining a first entry in a first database has a logically related second entry in a second database. Assigning, without reference to the second entry or the second database, a first unique identifier to the first entry and a second unique identifier to the second entry without reference to the first entry or the first database. Unloading the first entry without searching the second database and the second entry without searching the first database. Loading the first unloaded entry into a third database (creating a third entry) and writing a pointer into the third entry that includes the second unique identifier. Loading the second unloaded entry into a fourth database (creating a fourth entry) and writing a pointer into the fourth entry that includes the first unique identifier.

In one embodiment, the first and second databases are Full Function databases and the third and fourth databases are High Availability Large Databases (HALDBs). In another embodiment, the first and second entries are physically paired logically related child segments. In yet another embodiment, a databases entry (e.g., segment's) physical parent identifiers and data component may be used to create a keyed cross-reference file—this file being used during database load operations (e.g., when populating the third and fourth databases). In still another embodiment, the written pointer comprises an Extended Pointer Set (EPS) pointer. A computer executable program to implement the disclosed methods may be stored in any media that is readable and executable by a computer system.

DETAILED DESCRIPTION

This disclosure pertains to systems, methods, and computer readable medium for migrating Information Management System (IMS) Full-Function databases to IMS High Availability Large Databases (HALDBs). Generally speaking, Full Function database conversion operations in accordance with this disclosure assign a unique identifier to each segment having a physically paired logical child segment. These unique identifiers may be used during HALDB load operations to identify a segment's physically paired logical child segment. Use of unique identifiers as disclosed herein permit Full Function database conversion operations to avoid the input-output (I/O) and compare operations needed by prior art conversion techniques.

In the following description, for purposes of explanation, numerous specific details are set forth in order to provide a thorough understanding of the inventive concept. As part of the this description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the database software development field having the benefit of this disclosure.

Figure 1:
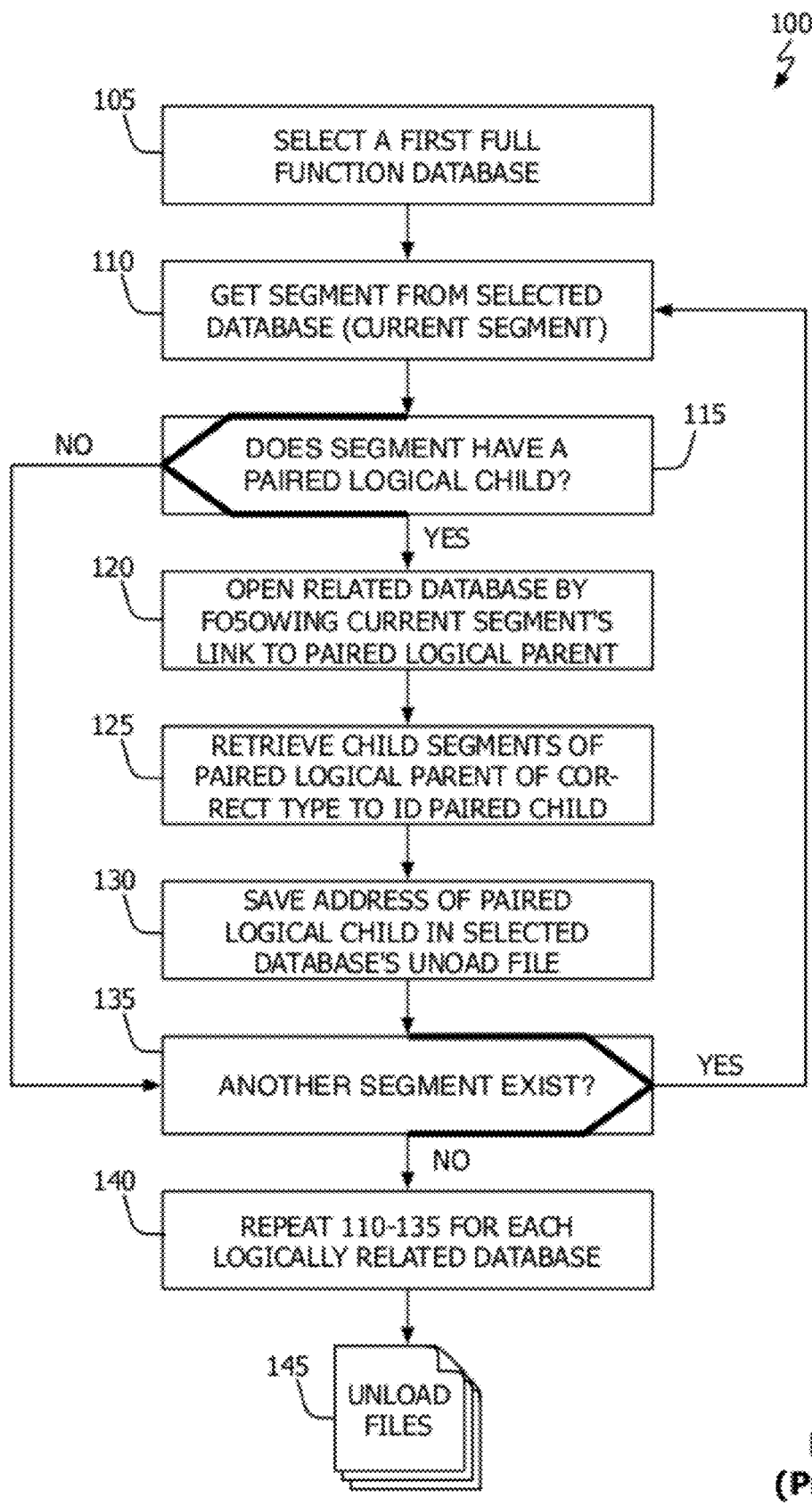
FIG. 1 shows, in flowchart form, a Full Function to HALDB unload process in accordance with the prior art.
Figure 2:
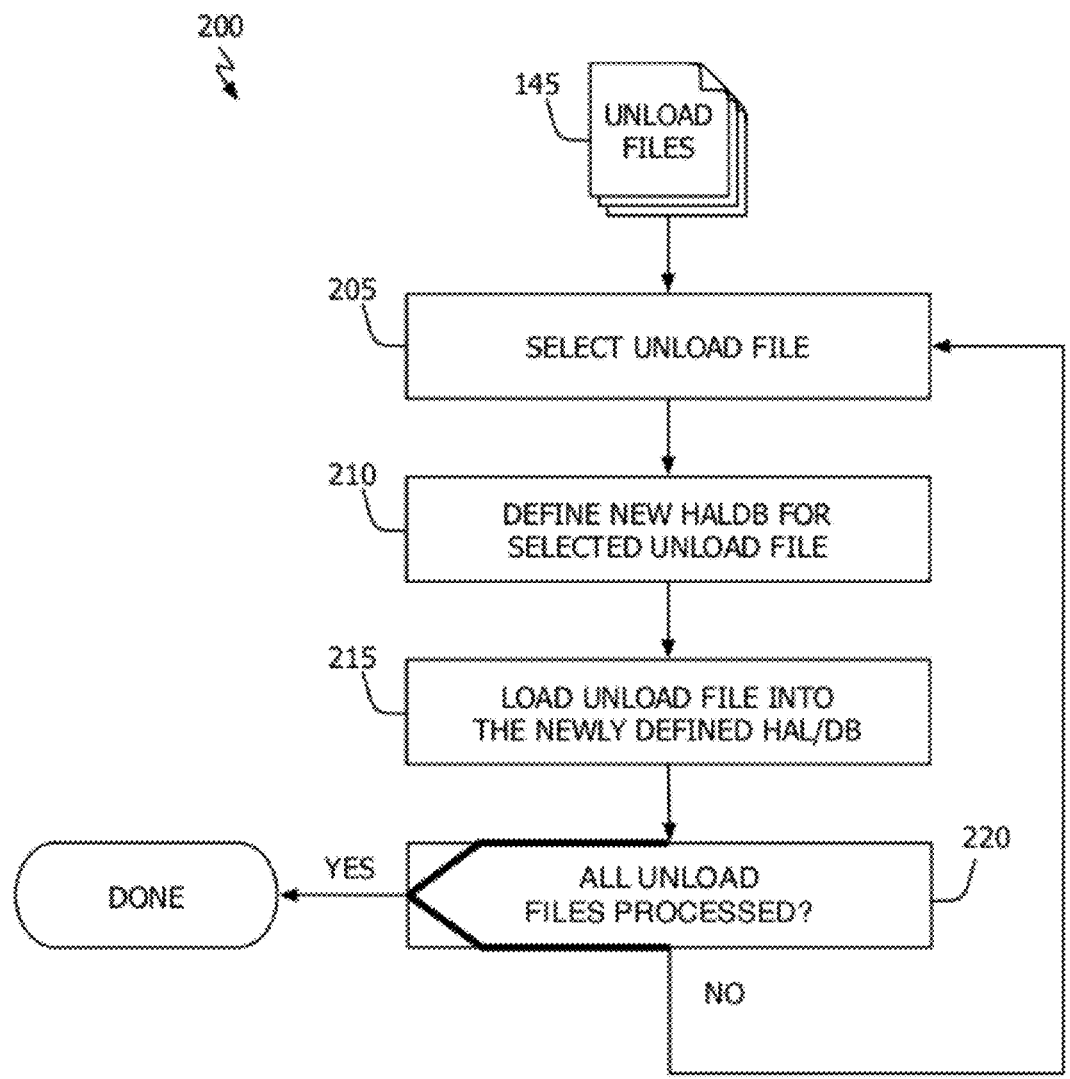
FIG. 2 shows, in flowchart form, a Full Function to HALDB load process in accordance with the prior art.
Figure 3:
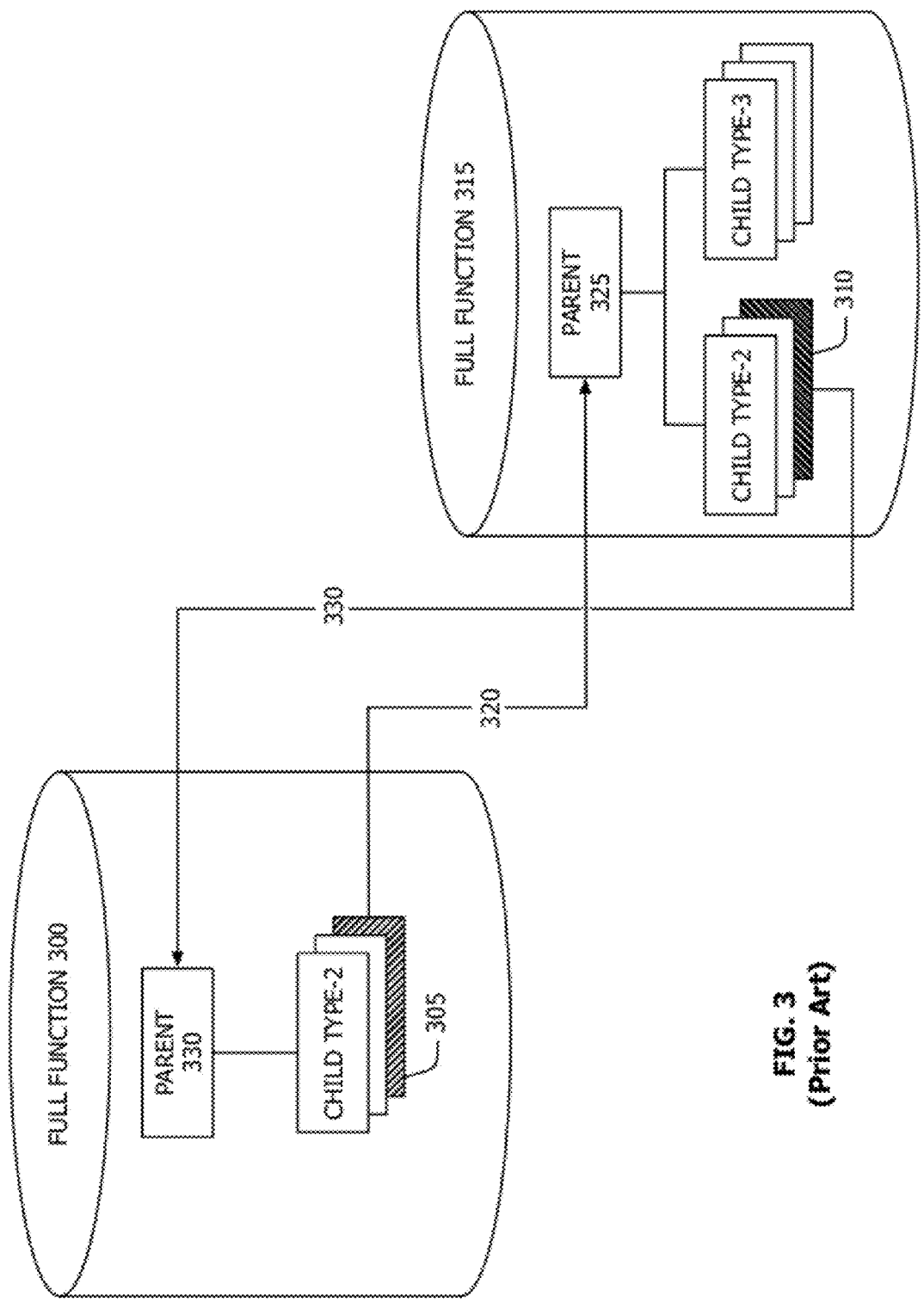
FIG. 3 shows, schematically, physically paired logical relationships between two Full Function databases in accordance with the prior art.
Figure 4:
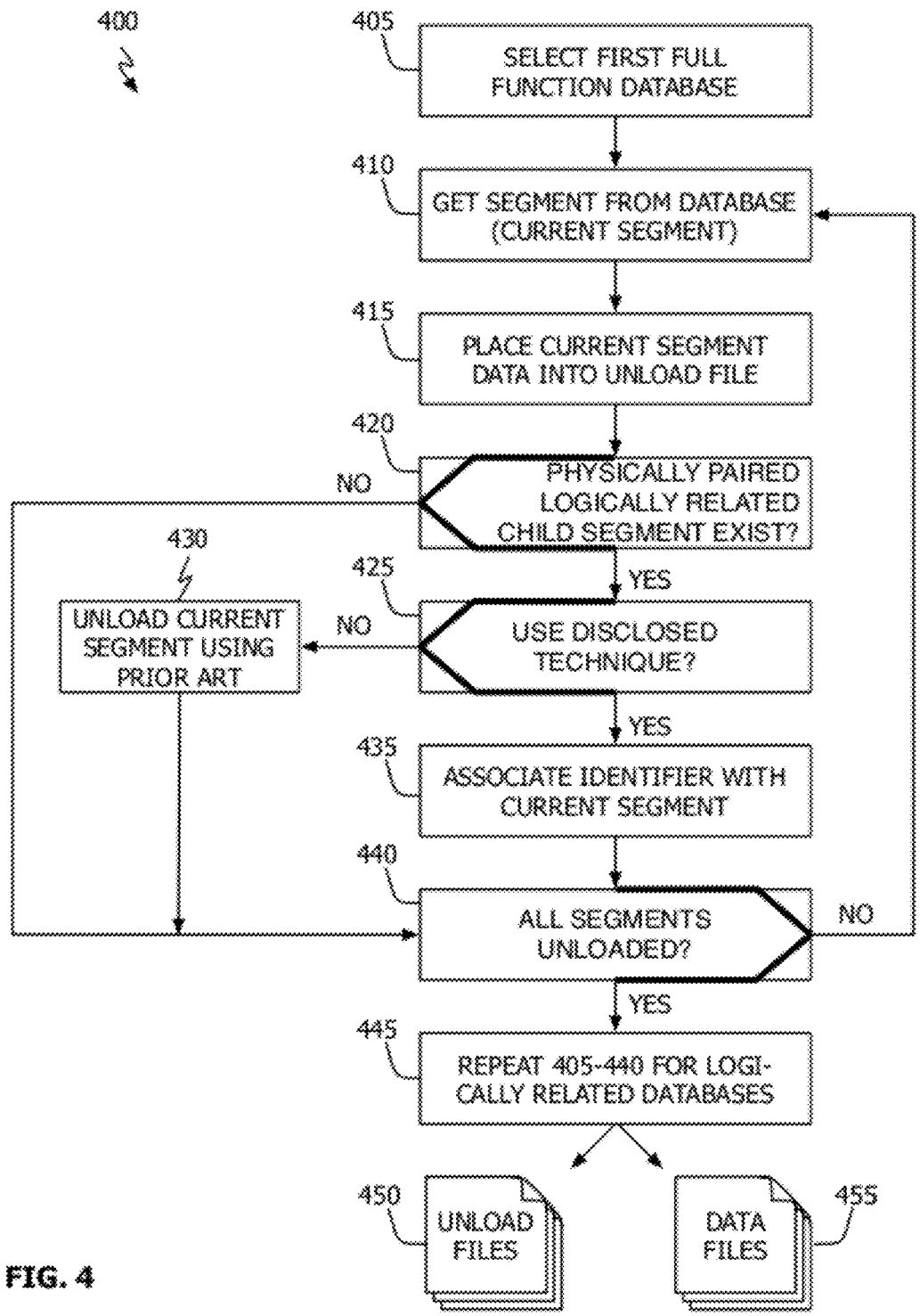
FIG. 4 shows, in flowchart form, an IMS Full Function database unload operation in accordance with one embodiment.

Referring to FIG. 4, unload operation 400 in accordance with one embodiment begins when a Full Function database is selected (the "current" database) for conversion to a HALDB (block 405). A first segment (the "current" segment) from this database is then unloaded (block 410) and its content is placed into the database's unload file (block 415). A check is made to determine if the current segment has a physically paired logical child segment in the current or another Full Function database (block 420). It will be understood by those of ordinary skill that the current database's DBD may be consulted to determine this information. If the current segment does not have a physically paired logical child segment (the "NO" prong of block 420), operations continue at block 440 (see discussion below). If, on the other hand, the current segment has a physically paired logical child segment (the "YES" prong of block 420), a second check is made to determine if the current segment should be unloaded in accordance with this disclosure (block 425). If the current segment is not to be unloaded in accordance with this disclosure (the "NO" prong of block 425), it may be processed in accordance with prior art techniques such as that shown in FIG. 1 (block 430), whereafter operations continue at block 440 (see discussion below).

If the current segment is to be unloaded in accordance with this disclosure (the "YES" prong of block 425), a unique identifier is associated with the current segment and, along with other segment data, is written to a data file separate from that of the current database's unload file (block 435). It is this unique identifier that may be used in accordance with this disclosure to associate the current segment with its physically paired logical child segment(s) without the need to search any of the related databases' at unload time. In one embodiment, each segment type to be unloaded in accordance with block 435 may have a DD statement in unload operation 400's jobs steps JCL whose database name matches the current segment's name. In another embodiment, all segments having a physically paired logical child segment may be treated in accordance with this disclosure.

If the current database has segments that remain to be unloaded (the "NO" prong of block 440), operations continue at block 410. If the current database has been completely unloaded (the "YES" prong of block 440), acts in accordance with blocks 405-440 are repeated for each database that has a physically paired logical relationship with the current database (block 445). The result of unload process 400 will be two or more database unload files 450 and two or more corresponding data files 455. It will be appreciated that the set of databases that may be logically related as described herein can be quite large. In one embodiment, Full Function database-1 may be logically related to Full Function databases 2 through N, where 'N' is a large integer. In another embodiment, Full Function database-1 may be logically related to Full Function database-2 which may be logically related to Full Function database-3, and so on. In still another embodiment, any combination of these two illustrative cases may exist.

Figure 5:
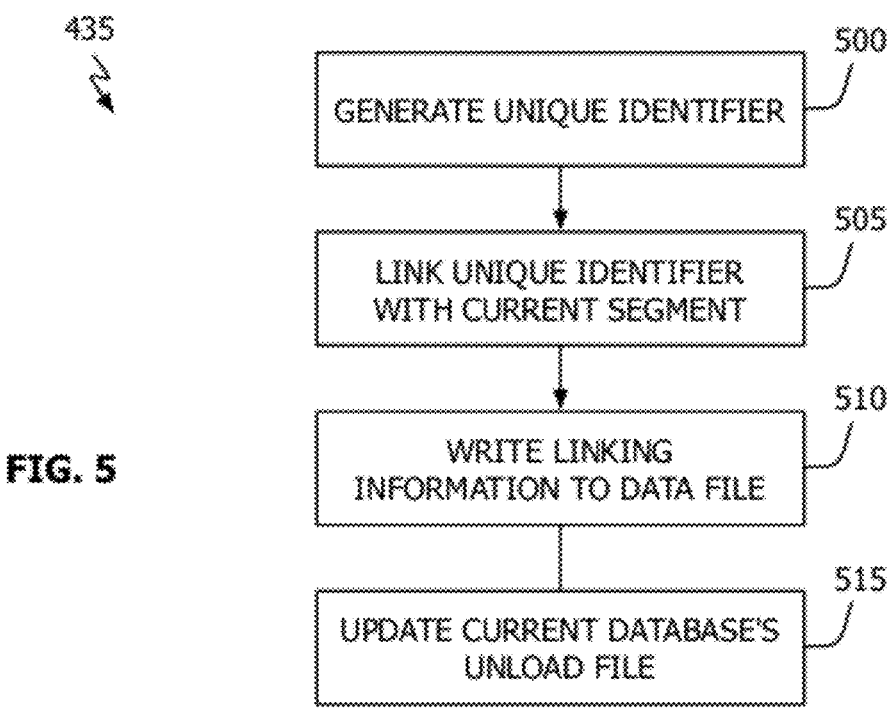
FIG. 5 shows, in flowchart form, a process of associating a unique identifier with an unloaded segment in accordance with one embodiment.

Referring now to FIG. 5, the act of associating a unique identifier with the current segment in accordance with block 435 can begin by generating a unique identifier (block 500). In one embodiment, the unique identifier may be a sequential number beginning with one (1) for the first segment processed in accordance with block 435 and continuing through all segments so processed in the current database. The unique identifier may also be very precise time stamp or the current segment's RBA (better choice). Once generated, the unique identifier may be linked to the current segment by combining it with other segment data (block 505) and written to a data file (block 510). For example, the unique identifier may be linked to the current segment by combining it with the segment's physical parent's identifier, logical parent's identifier, and data component. It will be recognized that a segment's physical and logical parent identifiers may be Relative Byte Addresses (RBAs) or concatenated keys, where the databases DBDs specify which of the two representations are used. It will also be recognized that, in an IMS database, a segment's data component is often referred to as Fixed Intersection Data (FID). Illustrative file types suitable for use as a data file include, but are not limited to, sequential files, Key Sequence Data Set (KSDS) files and IMS files. In one embodiment, the data file may be identified in the current segment type's DD statement (see discussion above). While not necessary, as disclosed herein, there is one data file for each Full Service database unloaded in accordance with operation 400.

Once the current database's data file has been updated, the database's unload file may also be updated (block 515). In one embodiment, the current segment's unload record's prefix area may be updated to include the segment's unique identifier and an indication that the current segment as having been processed in accordance with unload operation 400. In addition, a new area may be created and appended to the unload record (making a "suffix" area) in which the segment's physical parent identifier, logical parent identifier and FID may be stored (see discussion above). In another embodiment, the FID may be left out of the unload record's suffix area and reconstructed later, at load time, from the unload record's segment data.

Figure 6:
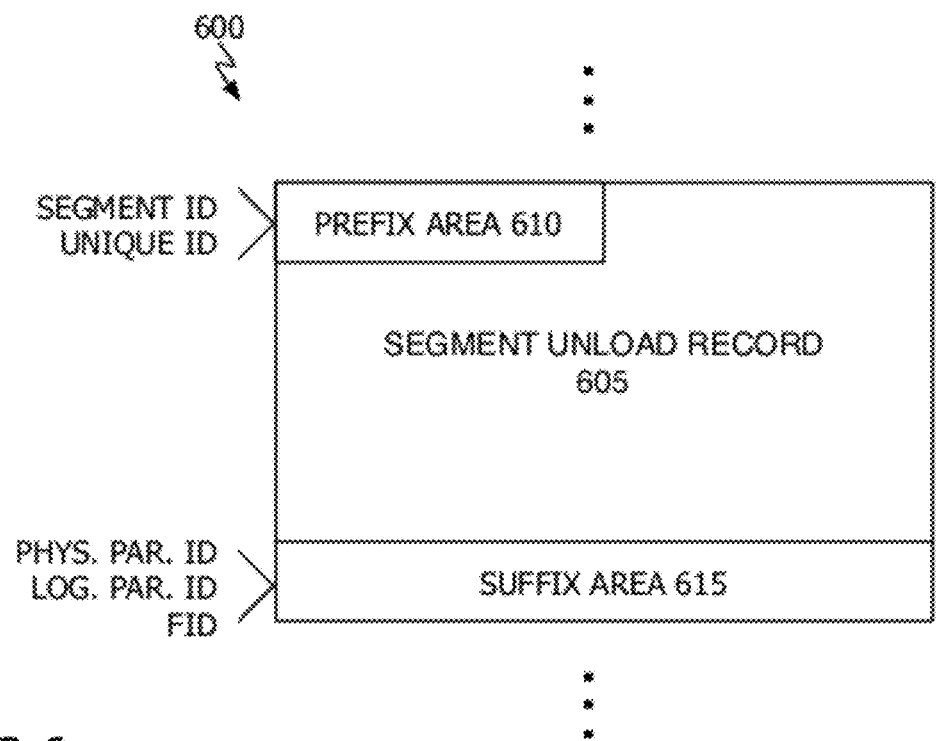
FIG. 6 illustrates an IMS unload file in accordance with one embodiment.

Referring to FIG. 6, IMS unload file 600 conventionally includes an unload record 605 for each unloaded segment. Also conventionally, each unload record 605 includes prefix area 610. Unconventionally, suffix area 615 may be appended to each unload record whose associated segment is processed in accordance with block 435. In one embodiment, spare bits (or bytes) in prefix area 610 may be used to indicate each segment processed in accordance with block 435. (As used herein, "unused" means any bits (or bytes) that are not otherwise defined for a specified use.) As shown, prefix area 610 is updated to indicate the segment was processed in accordance with block 435 (segment ID) and to include the segment's unique identifier. This may be done, for example, by writing the segment's unique identifier to the field normally used to hold the segment's RBA (i.e., the IOOLD field). Also as shown, suffix area 615 includes the segment's physical parent identifier, logical parent identifier and FID (see discussion above). In another embodiment, suffix area 615 may be eliminated and the information stored therein may be stored in prefix area 610.

Figure 7:
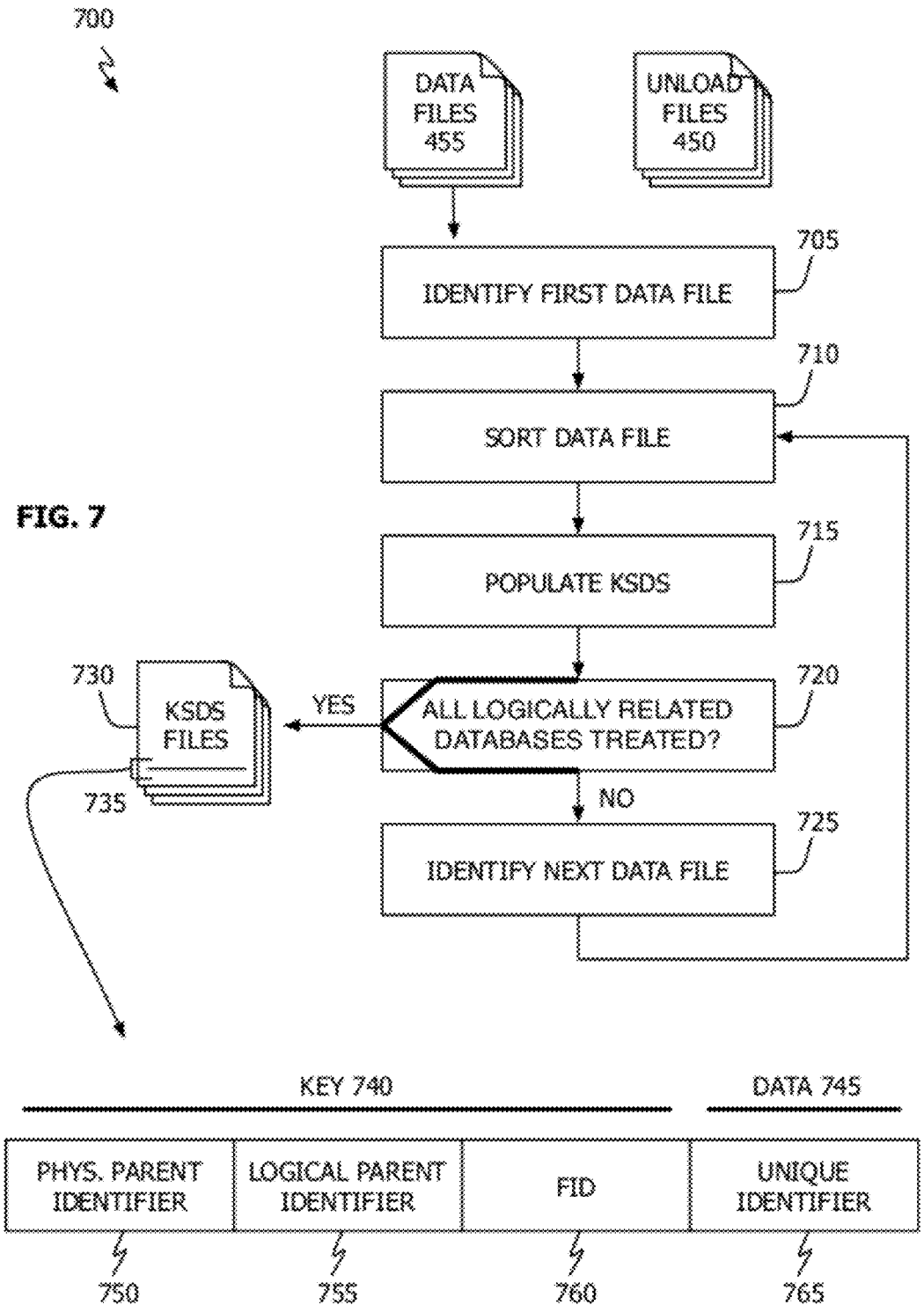
FIG. 7 shows, in flowchart form, an intermediate operation in accordance with one embodiment.

Referring to FIG. 7, data files 455 may be converted to KSDS files suitable for input to a HALDB load operation (see discussion below) in accordance with intermediate operation 700. As shown, after identifying a first data file (block 705), it is sorted (bock 710) with the sort's output used to populate a KSDS file (block 715). The KSDS file may, for example, be generated by the IMS IDCAMS routine/function. If there remains data files to process (the "NO" prong of block 720), a next data file is selected (block 725) whereafter operations continue at block 710. If all data files associated with a set of unloaded Full Function databases have been converted to KSDS files in accordance with blocks 710-715 (the "Yes" prong of block 720), intermediate operation 700 is complete, the result being two or more KSDS files 730, each one having a corresponding database unload file (i.e., 450). Following creation of KSDS files 730, data files 455 may be deleted.

As described above, each entry in a data file includes the associated segment's physical parent identifier, logical parent identifier, FID and a unique key generated as described above (see FIG. 4). In accordance with block 710, data file entries may be sorted on the combination of physical parent identifier, logical parent identifier and FID. Thus, when populating a KSDS file in accordance with block 715 this combination can make up the key component of a KSDS entry while the segment's unique identifier may be stored as the KSDS entries data component. This is shown in FIG. 7 where illustrative KSDS entry 735 may be made up of key component 740 and data component 745. Key component 740 may itself be composed of the segment's associated physical parent identifier 750, logical parent identifier 755 and FID 760. Data component 745 may be the segment's unique identifier 765.

It will be recognized that VSAM limits the maximum key size (e.g., key 740) for a KSDS file to 255 bytes. Accordingly, if the combination of identifiers 750, 755 and FID 760 exceeds this limit, the approach described here may not work. In practice, this is generally not a problem as FID size is kept small for other reasons (e.g., retrieval efficiency). Many embodiments are possible to handle this problem. For example, the first 255 bytes may be written to a KSDS key and any remaining bytes might be stored as data (e.g., 745) along with the unique identifier (e.g., 765) plus a pointer field to handle possible duplicates. The pointer field could then form a link as a chain of RBAs holding similar records in a VSAM Entry Sequenced Data Set (ESDS).

In one embodiment, intermediate operation 700 may be performed automatically as an integral part of unload operation 400. In another embodiment, intermediate operation 700 may be performed as a completely separate operation as outlined here. In still another embodiment, intermediate operation 700 may be performed as part of a HALDB load operation. In yet another embodiment, intermediate operation 700 may be performed in combination with user input. For example, once unload files 450 and data files 455 have been generated for each Full Function database in a set of physically paired logically related databases, unload operation 400 may simply generate JCL statements that, when executed by a user, perform intermediate operation 700. In this embodiment, the user retains the ability to adjust the automatically generated statements to conform to their particular shop standards (e.g., to account for a user's unique dataset and volume names). Once these changes have been made, the user may execute the prepared statements. In yet another embodiment, the JCL statement modifications identified here as being manually performed may instead be provided by way of input parameters to unload operation 400's JCL stack.

Figure 8:
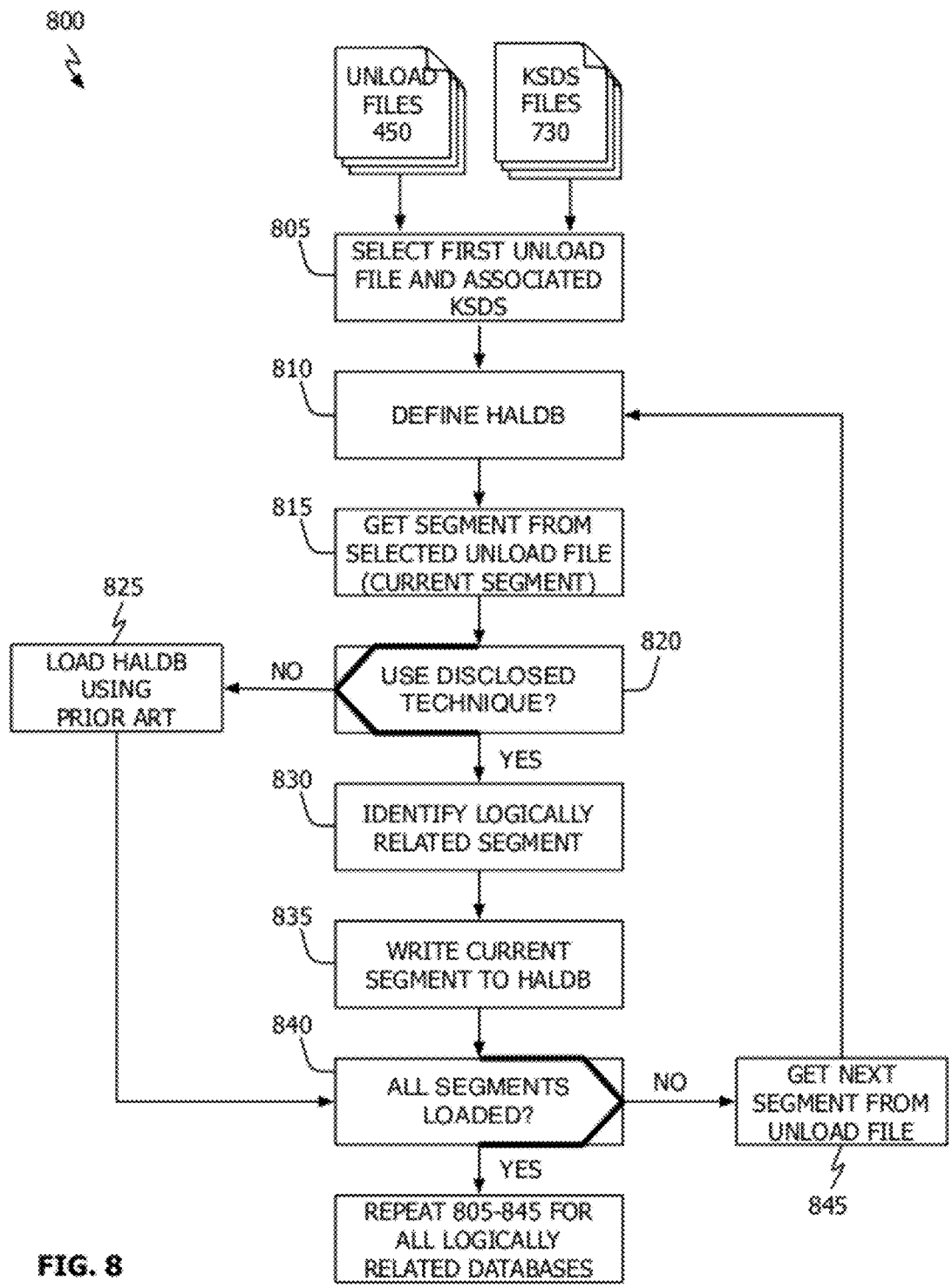
FIG. 8 shows, in flowchart form, a HALDB load operation in accordance with one embodiment.

Once unload operation 400 and intermediate operation 700 have completed, HALDBs may be defined and loaded, thereby completing the Full Function to HALDB conversion process. Referring to FIG. 8, load operation 800 in accordance with one embodiment includes selecting a first Full Function database unload file and its corresponding KSDS file (block 805). A HALDB may then be defined for the selected database (block 810) and, once defined, a first segment's information (the "current" segment) may be obtained from the selected unload file (block 815). If the current segment was not unloaded in accordance with block 435 (the "NO" prong of block 820), it may be loaded into the HALDB in accordance with the prior art (block 825), whereafter operations continue at block 840 (see discussion below). As noted above, in one embodiment an unload file's header records may be used to identify those segments that were unloaded in accordance with this disclosure.

If the current segment was unloaded in accordance with block 435 (the "YES" prong of block 820), the current segment's physically paired logical child segment is identified through use of the currently selected unload file's corresponding KSDS file (block 830). The logically related segment's unique identifier may be used to generate an unhealed Extended Pointer Set (EPS) that, along with the current segment's data, may be written to the current segment's HALDB entry (block 835). If the currently selected unload file contains additional segments that remain to be loaded (the "NO" prong of block 840), the next unload record is obtained (block 845) whereafter operations continue at block 810. If all of the current unload file's records have been loaded (the "YES prong of block 840), operations in accordance with blocks 805-845 are repeated for all logically related databases.

Figure 9:
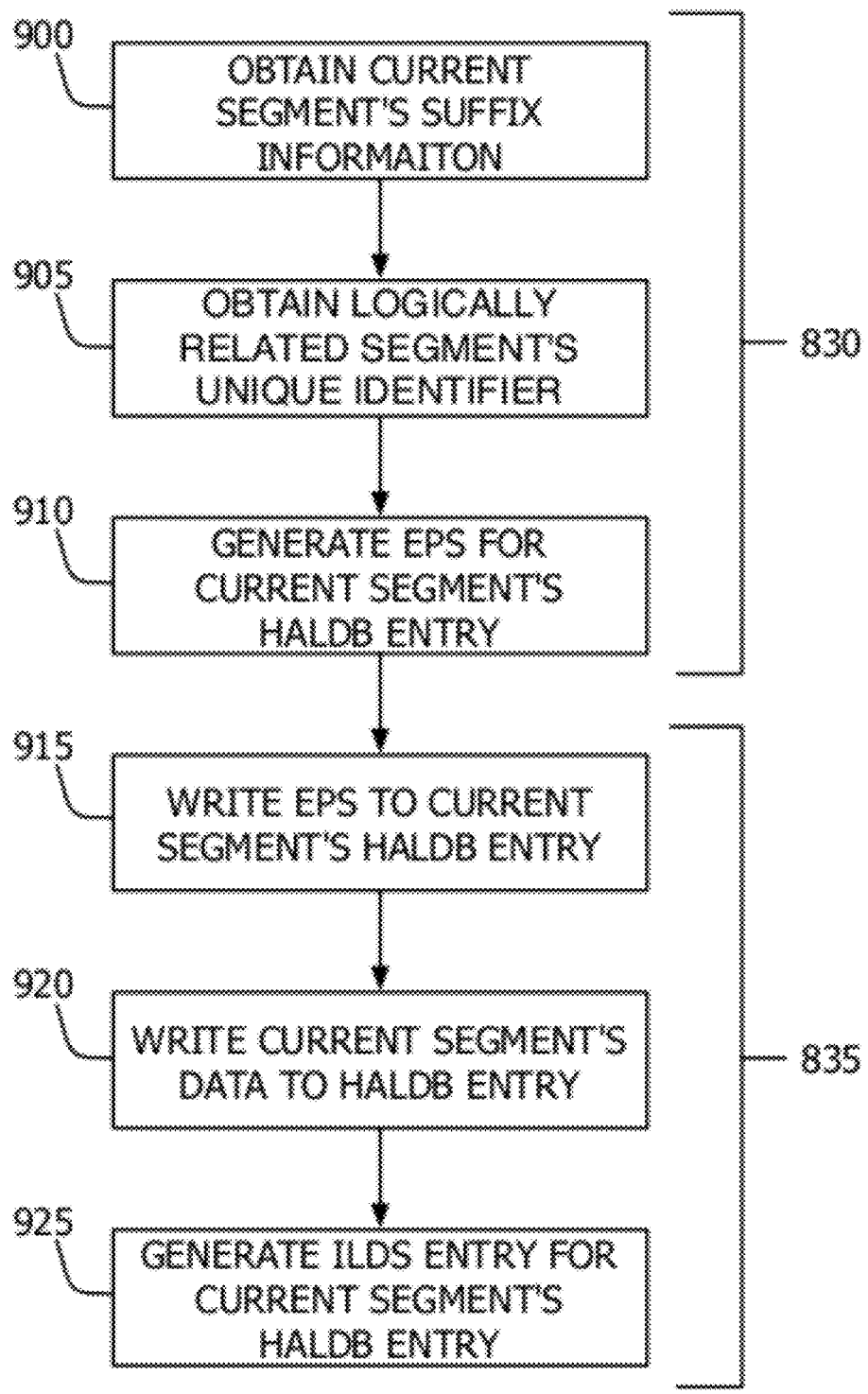
FIG. 9 shows, in flowchart form, a linking operation in accordance with one embodiment.

Referring to FIG. 9, the current segment's physically paired logical child segment may be identified by first retrieving information stored in the current segment's unload record's suffix area (block 900). As previously described, the current segment's unload record's suffix area includes the segment's physical parent identifier, logical parent identifier and FID (see FIG. 6). This information may be applied (i.e., as a key) to the current segment's logically related database's KSDS file. When this is done, the unique identifier associated with that entry having the same parent identifiers and FID is returned (block 905).

Figure 10:
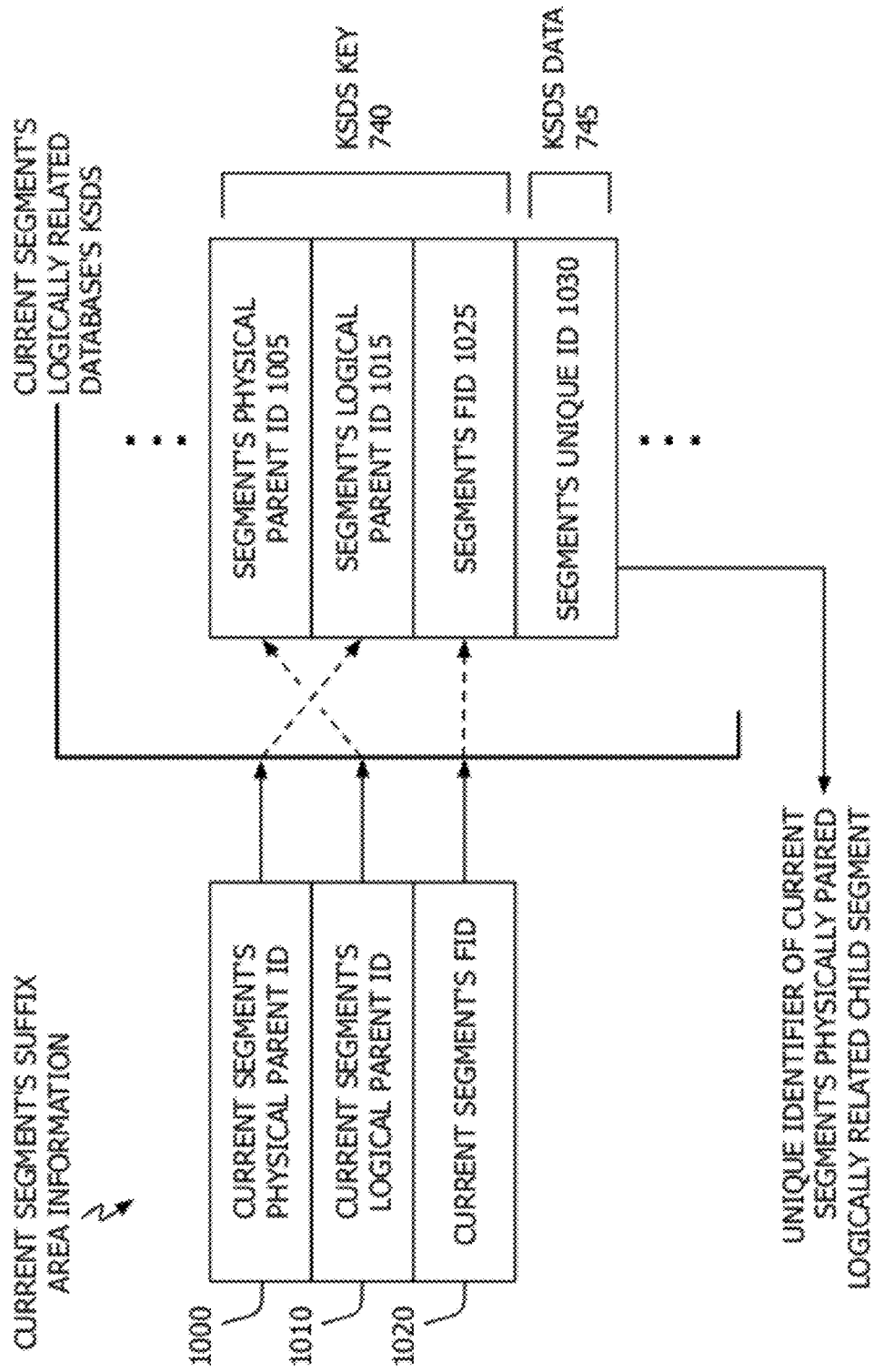
FIG. 10 shows, schematically, retrieval of a segment's physically paired logically related segment's unique identifier in accordance with one embodiment.

Referring to FIG. 10, this operation works because the current segment's physical parent identifier 16 is the same as the logical parent identifier 17 of the associated physically paired logical child segment. Similarly, the current segment's logical parent identifier 1010 is the same as the physically paired logical child segment's physical parent identifier 1015 and the current segment's FID 1020 is the same as the physically paired logical child segment's FID 625. Thus, when fields 16, 1010 and 1020 are applied to a KSDS file setup as described above, they act as that KSDS' key—the result of which is the retrieval of data component 1030. In this case, the current segment's physically paired logical child segment's unique identifier.

Returning again to FIG. 9, the current segment's physically paired logical child segment's unique identifier 1030 may be used to generate an EPS for the current segment's HALDB entry (block 915). One of ordinary skill in the art will recognize that an EPS traditionally includes a segment's partition number, reorganization number and the RBA of the segment's logically related segment. In accordance with this disclosure, however, the current segment's EPS includes a partition number (whose default value during load operations may be 0x00), reorganization number (whose default value during load operations may be 0x00) and the unique identifier of the current segment's physically paired logical child segment (e.g., 1030). The EPS so generated may be written, as is done conventionally, to the current segment's HALDB entries prefix area (block 920). The current segment's data component may also be written to the segment's HALDB's entry (block 920).

In an embodiment designed to convert partitioned Full Function databases to HALDBs (such as those generated by the Partitioned Data Base Facility from Neon Enterprises Software of Sugar Land, Tex.), the EPS' partition field may correspond to the Full Function database's partition number rather than being set to 00x0 as described above.

Following operations 915-920, an entry corresponding to the current segment may be made into the HALDB's Indirect List Data Set (ILDS) file (block 925). In the prior art, each ILDS entry for a converted paired logical child segment includes a segment's partition number (which may be zero), reorganization number (which may be zero) and the RBA of the segment's physically paired logical child segment. In accordance with this disclosure however, each ILDS entry corresponding to a Full Function database segment treated in accordance with block 435 includes a partition number (whose default value during load operations may be 0x00), reorganization number (whose default value during load operations may be 0x00) and the unique identifier of the current segment. It will be recognized that these elements are used in the making of the ILDS key. The corresponding ILDS data component may then be loaded with the RBA of the current segment in its HALDB (block 925).

With these operations complete, a Full Function to HALDB conversion process in accordance with this disclosure is complete. (At this point, KSDS files 730 may be deleted.) It will be recognized by those of ordinary skill that the EPS generated in accordance with block 910 is an unhealed EPS. Accordingly, a first access to a HALDB segment's physically paired logical child segment following conversion will require that the unhealed EPS be healed. Because of the manner in which HALDB ILDS file entries are generated in accordance with this disclosure, standard IMS EPS healing mechanisms may be used to uniquely identify the RBA of a target child segment.

Comparing prior art unload operation 12 (blocks 13-21) with that of unload operation 400 makes readily apparent some of the differences between the prior art approach to converting a Full Function database and the approach disclosed herein. One difference is that unload operation 400 does not search any logically related database as does prior art operation 12. For those database sets having long twin chains, paired segment retrieval operation 17 of FIG. 1 can cause an extremely large number of physical I/O requests to be issued—resulting in very long elapsed times to accomplish a Full Function to HALDB conversion. In contrast, unload operation 400 eliminates all I/O requests associated with identifying physically paired logical child segments. In particular, databases that have long chains of paired logical children segments have been found to benefit significantly from the disclosed technique. For example, in a collection of IMS databases in which the longest chain of physically paired logically related children segments was 20 million, the conversion time using a process in accordance with 400 was eight (8) hours whereas the same conversion process using prior art techniques in accordance with 12 was forty (40) days. This improved performance was achieved by reducing the number of I/O operations required by prior art approach 12 from approximately 70 million (the average number of children segments searched to find a match with the "current" segment) times 20 million (the number of times needed to process each child segment) to virtually zero (in accordance with operation 400).

Figure 11:
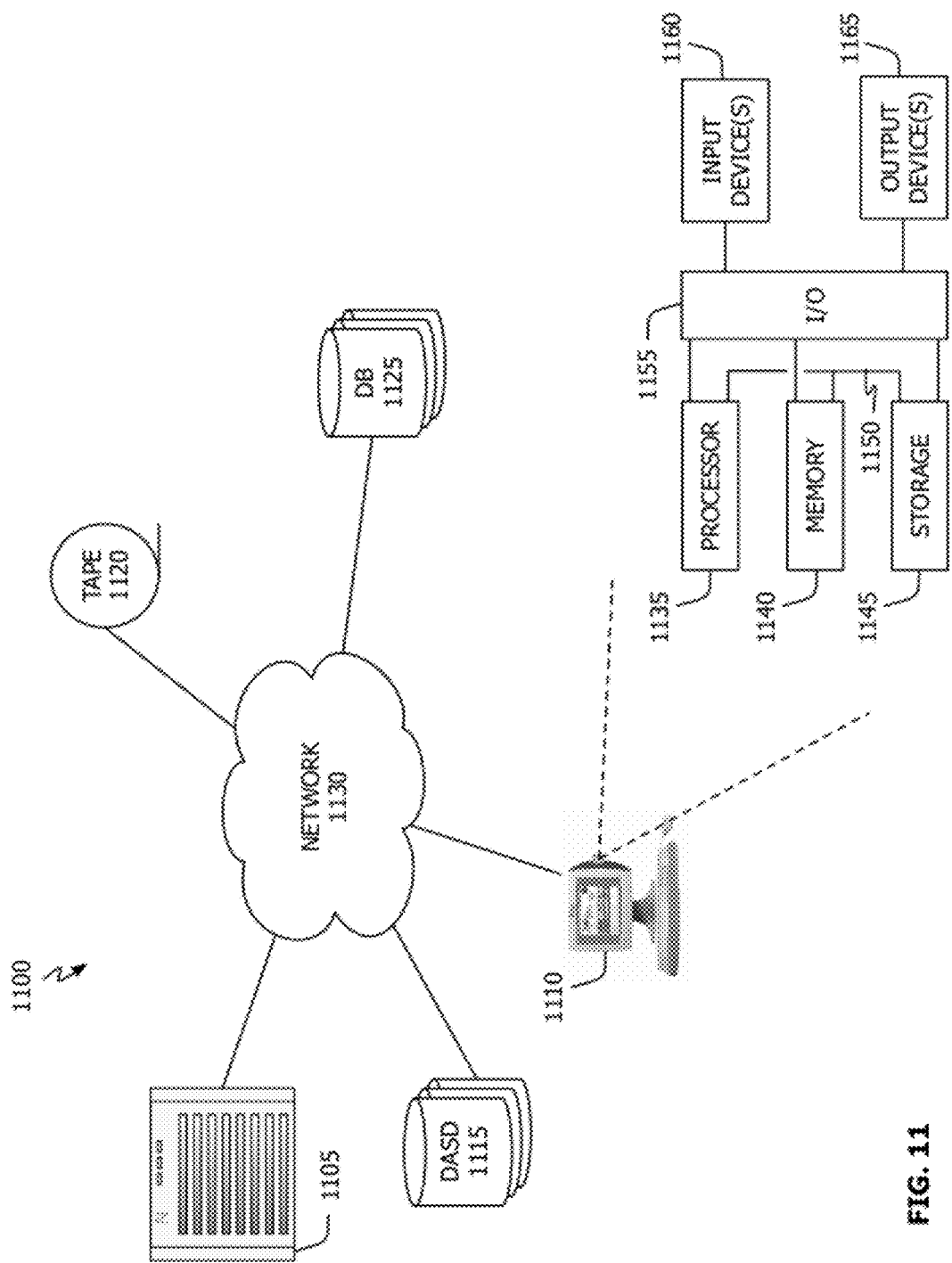
FIG. 11 shows, in block diagram form, an illustrative computer network within which a Full Function to HALDB conversion process as described herein may take place.

Referring to FIG. 11, in one embodiment acts in accordance with FIGS. 4-10 may be performed by one or more devices such as those shown as part of system 112. As shown, system 112 includes mainframe computer system 113, workstation computer system 114, multiple Direct Access Storage Devices (DASD) 115, tape storage unit 116 and one or more IMS databases 117 interconnected by network 118. It will be recognized that system 112 may include a large number of other devices (only a few are shown here for ease of illustration) that may be coupled through multiple networks (all of which are represented by network 118) using any number of technologies (e.g., wireless or wired).

Processing devices such as mainframe computer system 113 and workstation 114 may themselves comprise programmable control devices (e.g., central processing units), memory and storage. For example, illustrative workstation 114 may include processor 119, memory 120 and storage 121 coupled via bus 22. Workstation 114 may also include input/output circuitry 23 through which one or more input devices 1160 (e.g., a keyboard, mouse and/or light pen) and one or more output devices 1165 (e.g., a display monitor or printer) may interact with the rest of the workstation computer system. In one embodiment, memory 120 is volatile random access memory used for program execution by processor 1136, whereas storage 121 comprises non-volatile storage such as, for example, magnetic and optical storage disks. By way of example, computer program code may be stored on storage 121. On execution, at least a portion of the computer program code may be transferred from storage 121 to memory 120 where it may be executed by processor 119. When executed, actions in accordance with FIGS. 4-10 may be realized.

Various changes in the components and circuit elements, as well as in the details of the illustrated operational methods are possible without departing from the scope of the following claims. For instance, it will be recognized that the operations identified in FIGS. 4-10 may be performed in alternate sequence from that shown, that some operations may be combined while others may be divided into finer steps. It will be further recognized that the disclosed Full Function to HALDB conversion process may be practiced without implementing all of the described steps. For example, information described as being placed into a segment's unload record's suffix area may be incorporated into either the segment record's prefix area or data component or, even, stored in an external file linked in a functional manner to the disclosed acts.

It will also be recognized that mainframe 113 and workstation 114 may include any programmable control device including, for example, one or more members of the Intel Atom®, Core®, Pentium® and Celeron® processor families from Intel Corporation or custom designed state machines. (INTEL, INTEL ATOM, CORE, PENTIUM, and CELERON are registered trademarks of the Intel Corporation.) Further, workstation 114 may comprise a Solaris® computer system. (SOLARIS is a registered trademark of Sun Microsystems, Inc.) Custom designed state machines may be embodied in a hardware device such as an application specific integrated circuit (ASIC) and/or a field programmable gate array (FPGA).

Storage devices such as storage 115 and 121 suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Finally, it is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A database conversion method, comprising:
   determining a first entry in a first database is logically related to a second entry in a second database by determining a first segment in a first Full Function database is physically paired and logically related to a second segment in a second Full Function database;
   assigning a first unique identifier to the first entry by:
      obtaining a first physical parent segment identifier for the first segment,
      obtaining a first logical parent segment identifier for the first segment,
      obtaining first Fixed Intersection Data (FID) for the first segment, and
      writing the first physical parent segment identifier, first logical parent segment identifier and the first unique identifier to a data file;
   assigning a second unique identifier to the second entry;
   unloading the first database, the unloaded first database including an unloaded first entry, wherein unloading the second database includes:
      unloading the first segment to a first unload record in a first unload file,
      updating a prefix area of the first unload record with the first unique identifier, and
      updating the first unload record with the first physical parent segment identifier, first logical parent segment identifier, and first FID;

unloading the second database, the unloaded second database including an unloaded second entry;
loading the unloaded first entry into a third entry in a third database, wherein the third database is a different type of database than the first and second databases;
writing a first pointer into the third entry, the first pointer comprising the second unique identifier;
loading the unloaded second entry into a fourth entry in a fourth database, wherein the fourth database is a different type of database than the first and second databases; and
writing a second pointer into the fourth entry, the second pointer comprising the first unique identifier.

2. The method of claim 1, further comprising updating the first unload file to indicate the first segment was unloaded in an unconventional manner.

3. The method of claim 2, further comprising creating a first Key Sequence Data Set (KSDS) file from the first data file, the first KSDS comprising the first physical parent segment identifier, first logical parent segment identifier, the first FID and the first unique identifier.

4. The method of claim 3, wherein the act of unloading the second database, comprises:
   obtaining a second physical parent segment identifier for the second segment;
   obtaining a second logical parent segment identifier for the second segment;
   obtaining second FID for the second segment; and
   creating a second KSDS file that includes the second physical parent segment identifier, second logical parent segment identifier, the second FID and the second unique identifier.

5. The method of claim 4, wherein the act of loading the unloaded first entry into a third entry in a third database, comprises:
   applying the first physical parent segment identifier, first logical parent segment identifier and first FID to the second KSDS to obtain the second unique identifier; and
   storing the first unloaded first segment into a first High Availability Large Database (HALDB) segment in a first HALDB.

6. The method of claim 5 wherein the act of writing a first pointer into the third entry, comprises updating an Extended Pointer Set (EPS) field in the first HALDB segment with the second unique identifier.

7. A non-volatile program storage device, readable by a programmable control device, comprising instructions stored on the program storage device for causing the programmable control device to perform the actions of:
   determining a first entry in a first database is logically related to a second entry in a second database by determining a first segment in a first Full Function database is physically paired and logically related to a second segment in a second Full Function database;
   assigning a first unique identifier to the first entry by:
      obtaining a first physical parent segment identifier for the first segment,
      obtaining a first logical parent segment identifier for the first segment,
      obtaining first Fixed Intersection Data (FID) for the first segment, and
      writing the first physical parent segment identifier, first logical parent segment identifier and the first unique identifier to a data file;
   assigning a second unique identifier to the second entry;
   unloading the first database, the unloaded first database including an unloaded first entry, wherein unloading the second database includes:
      unloading the first segment to a first unload record in a first unload file,
      updating a prefix area of the first unload record with the first unique identifier, and
      updating the first unload record with the first physical parent segment identifier, first logical parent segment identifier, and first FID;
   unloading the second database, the unloaded second database including an unloaded second entry;
   loading the unloaded first entry into a third entry in a third database, wherein the third database is a different type of database than the first and second databases;
   writing a first pointer into the third entry, the first pointer comprising the second unique identifier;
   loading the unloaded second entry into a fourth entry in a fourth database, wherein the fourth database is a different type of database than the first and second databases; and
   writing a second pointer into the fourth entry, the second pointer comprising the first unique identifier.

8. A computer network comprising:
   a plurality of processing units communicatively coupled to a computer network and configured to perform the actions of:
   determining a first entry in a first database is logically related to a second entry in a second database by determining a first segment in a first Full Function database is physically paired and logically related to a second segment in a second Full Function database;
   assigning a first unique identifier to the first entry by:
      obtaining a first physical parent segment identifier for the first segment,
      obtaining a first logical parent segment identifier for the first segment,
      obtaining first Fixed Intersection Data (FID) for the first segment, and
      writing the first physical parent segment identifier, first logical parent segment identifier and the first unique identifier to a data file;
   assigning a second unique identifier to the second entry;
   unloading the first database, the unloaded first database including an unloaded first entry, wherein unloading the second database includes:
      unloading the first segment to a first unload record in a first unload file,
      updating a prefix area of the first unload record with the first unique identifier, and
      updating the first unload record with the first physical parent segment identifier, first logical parent segment identifier, and first FID;
   unloading the second database, the unloaded second database including an unloaded second entry;
   loading the unloaded first entry into a third entry in a third database, wherein the third database is a different type of database than the first and second databases;
   writing a first pointer into the third entry, the first pointer comprising the second unique identifier;
   loading the unloaded second entry into a fourth entry in a fourth database, wherein the fourth database is a different type of database than the first and second databases; and
   writing a second pointer into the fourth entry, the second pointer comprising the first unique identifier.

9. A Full Function to High Availability Large Database (HALDB) database conversion method, comprising:
- identifying a first Full Function database stored on a first storage device;
- unloading a first segment from the first Full Function database;
- determining the first segment has a physically paired logically related child segment in a second Full Function database, said physically paired logically related child segment being a second segment;
- assigning a first unique identifier to the first segment;
- storing the first unique identifier, first parent identifiers and first fixed intersection data (FID) for the first segment in a first data file on a second storage device;
- generating a first unload record for the first segment;
- updating the first unload record to include the first unique identifier, first parent identifiers and the first FID;
- recording the first unload record in a first unload file on a third storage device, wherein the acts of unloading, determining and generating are preformed without searching the second Full Function database for the second segment;
- repeating the acts of unloading, determining, assigning, storing, generating, updating and recording on the second Full Function database to produce a second unique identifier, second parent identifiers and a second FID for the second segment, and a second data file and a second unload file for the second Full Function database;
- generating a first Key Sequence Data Set (KSDS) file from the first data file;
- generating a second KSDS file from the second data file;
- loading at least a portion of the first unload record from the first unload file into a first HALDB segment in a first HALDB stored on a fourth storage device;
- applying the first parent identifiers and first FID from the first unload record to the second KSDS file to obtain the second unique identifier;
- writing a first Extended Pointer Set (EPS) to the first HALDB segment, the first EPS comprising the second unique identifier;
- loading at least a portion of the second unload record from the second unload file into a second HALDB segment in a second HALDB stored on a fifth storage device;
- applying the second parent identifiers and second FID from the second unload record to the first KSDS file to obtain the first unique identifier; and
- writing a second EPS to the second HALDB segment, the second EPS comprising the first unique identifier.

10. The method of claim 9, wherein the act of storing the first unique identifier, first parent identifiers and first fixed intersection data (FID) for the first segment in a first data file, comprises:
- storing a logical parent identifier for the first segment in a first field of a first entry in the first data file;
- storing a physical parent identifier for the first segment in a second field in the first entry in the first data file; and
- storing the first unique identifier in a third field in the first entry of the first data file.

11. The method of claim 9, wherein the act of storing the first unique identifier, first parent identifiers and first fixed intersection data (FID) for the first segment in a first data file, comprises storing the first unique identifier, first parent identifiers and first FID for the first segment in a first sequential data file.

12. The method of claim 9, wherein the act of updating the first unload record to include the first parent identifiers and the first FID, comprises creating a suffix area to the first unload record and writing the first parent identifiers and the first FID into this suffix area.

13. The method of claim 9, wherein the act of recording the first unload record in a first unload file, further comprises updating a prefix area the first unload record to identify the first segment was unloaded in a special manner.

14. The method of claim 9, wherein the act of generating a first KSDS file from the first data file comprises:
- sorting the first data file; and
- loading the sorted first data file into the first KSDS.

15. The method of claim 14, wherein the act of sorting the first data file comprises sorting the first data file on the first parent identifiers and first FID.

16. The method of claim 15, wherein the act of loading the sorted first data file into the first KSDS comprises:
- loading the first parent identifiers and first FID as a key of the first KSDS file; and
- loading the first unique identifier as the data component of the first KSDS file.

17. The method of claim 9, wherein the act of loading at least a portion of the first unload record from the first unload file into a first HALDB segment in a first HALDB, further comprises generating an first Indirect List Data Set (ILDS) entry in a first ILDS file, wherein the first ILDS entry is associated with the first HALDB segment.

18. The method of claim 9, wherein the act of writing a first EPS to the first HALDB segment comprises writing the first unique identifier into a EPS field in the first HALDB segment.

19. The method of claim 9, wherein any two or more of the storage devices comprise the same storage device.

20. The method of claim 9, wherein at least one of the storage devices comprise random access memory.

21. A non-volatile program storage device, readable by a programmable control device, comprising instructions stored on the program storage device for causing the programmable control device to perform the actions of:
- identifying a first Full Function database stored on a first storage device;
- unloading a first segment from the first Full Function database;
- determining the first segment has a physically paired logically related child segment in a second Full Function database, said physically paired logically related child segment being a second segment;
- assigning a first unique identifier to the first segment;
- storing the first unique identifier, first parent identifiers and first fixed intersection data (FID) for the first segment in a first data file on a second storage device;
- generating a first unload record for the first segment;
- updating the first unload record to include the first unique identifier, first parent identifiers and the first FID;
- recording the first unload record in a first unload file on a third storage device, wherein the acts of unloading, determining and generating are preformed without searching the second Full Function database for the second segment;
- repeating the facts of unloading, determining, assigning, storing, generating, updating and recording on the second Full Function database to produce a second unique identifier, second parent identifiers and a second FID for the second segment, and a second data file and a second unload file for the second Full Function database;
- generating a first Key Sequence Data Set (KSDS) file from the first data file;
- generating a second KSDS file from the second data file;

loading at least a portion of the first unload record from the first unload file into a first High Availability Large Database (HALDB) segment in a first HALDB stored on a fourth storage device;

applying the first parent identifiers and first FID from the first unload record to the second KSDS file to obtain the second unique identifier;

writing a first Extended Pointer Set (EPS) to the first HALDB segment, the first EPS comprising the second unique identifier;

loading at least a portion of the second unload record from the second unload file into a second HALDB segment in a second HALDB stored on a fifth storage device;

applying the second parent identifiers and second FID from the second unload record to the first KSDS file to obtain the first unique identifier; and writing a second EPS to the second HALDB segment, the second EPS comprising the first unique identifier.

22. A computer network comprising:

a plurality of processing units communicatively coupled to a computer network and configured to perform the actions of:

identifying a first Full Function database stored on a first storage device;

unloading a first segment from the first Full Function database;

determining the first segment has a physically paired logically related child segment in a second Full Function database, said physically paired logically related child segment being a second segment;

assigning a first unique identifier to the first segment;

storing the first unique identifier, first parent identifiers and first fixed intersection data (FID) for the first segment in a first data file on a second storage device;

generating a first unload record for the first segment;

updating the first unload record to include the first unique identifier, first parent identifiers and the first FID;

recording the first unload record in a first unload file on a third storage device, wherein the acts of unloading, determining and generating are preformed without searching the second Full Function database for the second segment;

repeating the facts of unloading, determining, assigning, storing, generating, updating and recording on the second Full Function database to produce a second unique identifier, second parent identifiers and a second FID for the second segment, and a second data file and a second unload file for the second Full Function database;

generating a first Key Sequence Data Set (KSDS) file from the first data file;

generating a second KSDS file from the second data file;

loading at least a portion of the first unload record from the first unload file into a first High Availability Large Database (HALDB) segment in a first HALDB stored on a fourth storage device;

applying the first parent identifiers and first FID from the first unload record to the second KSDS file to obtain the second unique identifier;

writing a first Extended Pointer Set (EPS) to the first HALDB segment, the first EPS comprising the second unique identifier;

loading at least a portion of the second unload record from the second unload file into a second HALDB segment in a second HALDB stored on a fifth storage device;

applying the second parent identifiers and second FID from the second unload record to the first KSDS file to obtain the first unique identifier; and writing a second EPS to the second HALDB segment, the second EPS comprising the first unique identifier.

\* \* \* \* \*

UNITED STATES PATENT AND TRADEMARK OFFICE
CERTIFICATE OF CORRECTION

PATENT NO. : 8,321,480 B2  
APPLICATION NO. : 12/954085  
DATED : November 27, 2012  
INVENTOR(S) : David Albert Smith Page 1 of 1

It is certified that error appears in the above-identified patent and that said Letters Patent is hereby corrected as shown below:

On Title page, field (54), and in column 1, line 2, in "Title", delete "DATABASE" and insert -- DATABASE (HALDB) --, therefor.

In column 14, line 59, in claim 21, delete "facts" and insert -- acts --, therefor.

In column 16, line 8, in claim 22, delete "facts" and insert -- acts --, therefor.

Signed and Sealed this  
Nineteenth Day of March, 2013

Teresa Stanek Rea  
*Acting Director of the United States Patent and Trademark Office*